May 4, 1954     H. V. REES ET AL     2,677,780

RADIATION DETECTOR

Filed Dec. 28, 1951

INVENTOR.
HARRY V. REES
ARTHUR L. TIRICO
BY
ATTORNEYS

Patented May 4, 1954

2,677,780

UNITED STATES PATENT OFFICE 2,677,780

RADIATION DETECTOR

Harry V. Rees, Chappaqua, N. Y., and Arthur L. Tirico, Glen Ridge, N. J., assignors to Texaco Development Corporation, New York, N. Y., a corporation of Delaware Application December 28, 1951, Serial No. 263,748

11 Claims. (Cl. 313—93)

This invention relates to improvements in Geiger-Mueller radiation detectors and in particular to the types thereof known as multiple plate or, Hare detectors. As is known these detectors have much higher efficiencies for the detection of penetrative radiation such as gamma rays than the original or prototype Geiger-Mueller tubes. A brief review of why this is so will be helpful in understanding the objects of the present invention and how they are attained.

In proto-type Geiger-Mueller tubes the cathodes are cylindrical and are usually positioned, during operation, with their curved outer surfaces facing broadside to the source of radiation. As a result of this geometry the great majority of the impinging penetrative photons never get to be detected. This shortcoming, which is inherent in this type of tube, may come about in either or both of two ways: (1) because many photons simply fail to become involved in interactions within the cathode, and therefore fail to produce the charged particles needed for ionizing the gas filling of the tube if current pulses are to be produced, and/or (2) because many of the charged-particle by-products of the interactions which do take place fail to escape from the cathode into the gas filled interior of the tube. It comes about primarily in the first way because the cathode walls are so thin that the majority of the impinging photons of penetrative radiation go right through the entire tube without having interactions. Nor does the presence of a large volume of gas within the tube improve matters to any substantial degree since interactions occur in substantial numbers only in dense materials. Thus, incidentally, it should be borne in mind that the gas, which is so essential for the counting mechanism, i. e., for the gas amplification afforded by Townsend avalanches, is of substantially no significance in contributing to the total number of interactions. It comes about primarily in the second way because the cathode walls are so thick that a great many of such interactions as do take place will occur within them at greater distances from their interior surfaces than the penetrative range of the charged-particles which are released as by-products of these interactions. In other words the charged-particles have very limited capability for penetration as compared to the photons of the initial radiation. From the foregoing it will be seen that there is no possible wall thickness for these tubes at which high detection efficiencies will be achieved. All that can be hoped for is to avoid such extremely poor efficiencies that use of the tubes is impractical.

Multiple plate detectors have provided a great increase in detection efficiency by the use of wafer-like cathode elements whose greatest exposure to the source of radiation is edgewise. As a result a photon, such as a gamma ray, which enters an edge of a cathode element, or penetrates one of its sides at a very small grazing angle, will have a long path through the dense material and therefore a considerable likelihood of sustaining an interaction. Moreover the charged-particle by-products of such interactions will more often than not move off in entirely different, i. e., transverse, directions than directions corresponding to extensions of the paths of the radiation which produced them, i. e., they will usually move off in directions having large components at right angles to the exposed surfaces of the cathode element. Therefore multiple plate detectors offered a type of structure which results in an increase in the percentage of interactions and at the same time permits a higher percentage of the ionizing charged particles produced by the interactions to escape into the gas.

To provide areas of exposure of corresponding magnitude to those afforded by the outer surfaces of the cylindrical cathodes of the proto-type Geiger-Mueller tubes, each of these tubes employed a plurality of the wafer-like cathode elements arranged in spaced-apart relationship to constitute a stacked array. As a result the multiple plate type detectors include a much higher percentage of the sort of material, i. e., dense material, which is capable of interacting with penetrative radiation, than was ever provided in the earlier Geiger-Mueller types of tubes of equivalent volume.

In addition to the occurrence of an interaction within the cathode, and of the escape of one or more ionizing charged particles from the point of interaction into the gas filling of the tube, one more occurrence is necessary to complete the detection of an intercepted photon of radiation. It is that the charged particle(s) bring about a Townsend avalanche. To do this, it (or they) must ionize one or more atoms of the gas, i. e., produce secondary electrons, in a region within the tube where a sufficient accelerating gradient exists to start an avalanche of ionization. In proto-type Geiger-Mueller tubes this last requirement is met almost automatically, in most cases, because all parts of the interior surfaces of their cathodes are directly exposed to their centrally located anodes. Therefore any negative charged particle which escapes into the interior of the tube and/or any secondary electron which it produces by ionization has a very great likelihood of being accelerated toward the anode. To meet this requirement in multiple plate detectors, arrangements have been devised which are intended to afford unimpeded discharge paths to an anode from all regions, adjacent the surfaces of the cathode elements, into which charged particles are likely to escape. For example in many of these arrangements each of one or more fine wire anodes extends in perpendicular, rather than parallel, relationship to the surfaces of the cathode elements, such as through a row of aligned holes formed respectively therein, the elements being positioned in alignment and adjacent to each other, though slightly spaced apart, to make this possible. Thus both surfaces of each element can "see" exposed portions of an anode along straight lines which are unobstructed by any part of any other cathode element. A simple example of such an arrangement is one in which each of the cathode elements is a circular disc having a small central aperture; the discs are arranged with their perimeters and apertures in alignment and their surfaces in a parallel spaced relationship; and a single fine wire anode extends through the center of the aligned row of apertures.

Thus multiple plate detectors met two urgent needs: (1) provision of greater amounts of dense material, in a detector head, disposed in the most probable paths of the penetrative radiation to be detected; and (2) provision of a geometry affording a high-escape incidence of the charged-particle by-products of interactions and a reasonable chance for collection thereof, despite the increased amounts of material. However the greater structural complexity of their arrangements, such as their arrangements described above, made it much more difficult to maintain a high percentage of collection of the charged-particle by-products and/or their secondaries by the anode(s) of the tube. If the cathode array of a simple multiple plate detector having circular-disc cathode elements and a single fine wire anode, is assembled with extremely small inter-element spacings, e. g., for the purpose of maximizing the number of cathode elements containable within a given volume of detector head and thereby the incidence of interactions, then the collecting field of the anode would not be able to penetrate deeply enough into these spacings to draw out most of the charged-particle by-products and/or the secondary electrons which they produce in the gas. Because of this many of them would not be effective to start Townsend avalanches and the interactions which produced these particles would go uncounted. If, on the other hand, large spacings were used, e. g., to increase the particle-collecting efficiency of the device, then the incidence of interactions would be reduced. Because of this there are optimum inter-element spacings for cathode discs of various diameters, and, at the present time, many of these are empirically known, e. g., the spacings between two inch discs should be about $\frac{3}{16}$ of an inch. From the foregoing it will be readily understood that where a detector head of small diameter can fit a certain need, it will be perfectly feasible to build it with very closely spaced plates. Such detectors will operate successfully with relatively high detection efficiencies, i. e., relatively high percentages of completed counts for intercepted photons. To increase the number of photons which will be intercepted by such a detector its total area of exposure to radiation should be increased by increasing its length rather than its diameter. However sometimes a detector head of large diameter is needed and then the situation is different. Consider the use of multiple plate detectors for measuring radiation in bore holes, e. g., for oil well-logging. In this case the detector head should be reasonably short in order to resolve between the radiation intensities of adjacent thin strata. The logical way of compensating for the short length, so as to still have an adequate over-all area of exposure, is to use large diameter plates, particularly so since this is permissible in bore holes of average size. However it is not possible to attain satisfactory collection of the charged-particle by-products in a large diameter multiple plate detector head in which small inter-element spacings are used in conjunction with a single fine wire centrally disposed anode, since the field of the anode cannot penetrate radially outward deeply enough into the inter-element spacings. Because of this, high density, close-spaced multiple-plate detectors, such as, for example the one shown in Fig. 1 herein, have been developed which utilize a plurality of anodes.

It is principally with providing improvements in this type of detector, i. e., in multiple-plate, multiple-anode detectors that the present invention is concerned. As is indicated above, there is a certain optimum inter-element spacing for cathode discs of any given diameter. However, this is true only if the discs are circular, i. e., if their surfaces which cooperate with a centrally disposed anode extend symmetrically about the anode, and it is not true of the cathode elements of multiple plate detectors of the kind shown in Fig. 1. If the elements of this type of detector are widely enough spaced from one another so that there is no region between any pair of plates into which the field of some anode does not usefully extend, then for regions lying between portions of the elements which are symmetrical about the respected anodes, as indicated at I by the dot and dash lines in Fig. 1, the spacing is larger than it need be. The result is that the incidence of interactions for a given number of intercepted photons will be adversely affected. On the other hand if smaller spacings be utilized, e. g., spacings which would be optimum for a simple, single-anode, multiple-plate detector comprising circular elements with diameters equal to those of the symmetrical areas I, then interactions occurring in portions of the cathode elements outside of these areas, such as the portions represented at 2 and 3 of Fig. 1 by being enclosed within dotted lines, would usually not get to be counted. If charged particles escape from interactions occurring in these portions, these particles and/or their secondaries might not come under the influence of the accelerating field of the anode and therefore might end up by returning to the cathode. In other words the presence of the portions 2 and 3 in the cathode elements of a detector as in Fig. 1 can lead to useless expenditures of radiation energy by producing interactions which will not result in counts.

For this reason a detector head comprising a number of separate symmetrical cathode arrays such as is shown in Fig. 2 is often to be preferred. In such a detector a photon of penetrative radiation which moved through one of the arrays without sustaining an interaction would be free to pass across an open space to enter another array without the possibility of its sustaining a useless interaction between them.

However, this type of detector head which in effect consists of a number of symmetrical multiple plate detectors in a single envelope, has a shortcoming of its own. It arises from the fact that an interaction which occurs near the perimeter of one of the plates may produce charged-particles whose initial velocities are in such directions as to carry them entirely outside of the array. Thus, since the charged-particles, e. g., Compton electrons and photo-electrons are often very energetic, then even though each individual array be properly proportioned to provide charged-particle collecting fields in all regions between the cathode elements, nevertheless these fields will not always be successful to capture the particles.

Accordingly it is an object of the present invention to provide an improvement in multiple plate detectors of the kind shown in Fig. 2 to increase the efficiency thereof by collecting charged particles and/or the secondaries produced thereby from regions within the detector but outside of the cathode arrays.

This object is attained by providing one or more auxiliary anodes which are mounted within the envelope of the detector but exteriorly of the cathode arrays contained therewithin.

Figure 1:
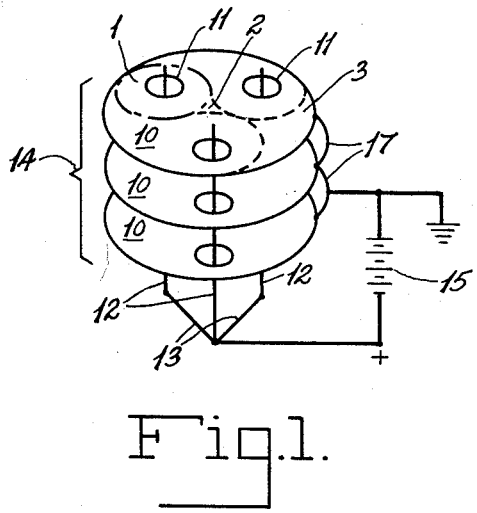
Fig. 1 represents a prior art multiple-plate, multiple-anode detector with certain areas on one of its cathode elements marked out in dotted lines to assist in explaining the limitation referred to above.

The prior art detector shown in Fig. 1 comprises a plurality of cathode elements 10. Each of these elements contains three apertures, 11 so located that equal-diameter circular areas which, like the area 1, are of an appropriate size, and are respectively concentric with the apertures, will be tangential to one another and to the perimeter of the element. The elements 10 are supported, in any suitable manner and by means not shown, in alignment with each other and in spaced apart relationship to constitute a cathode array 14 in which each aperture of each element is in alignment with a corresponding aperture of each of the others. A fine-wire anode 12 is supported centrally within each row of apertures and in insulating relationship to the array 14. As represented at 13 and 17 in the use of a detector of this kind the fine wire anodes and cathode elements are connected in parallel so that they may be commoned to the opposite poles of a source of the potential 15.

This type of structure is simple and rugged in that each single cathode element in effect functions as three. However, as explained above it unavoidably includes electrically ineffectual areas, like the areas 2 and 3 of Fig. 1 which adversely affect the efficiency of the detector. Since it is well known that this detector comprises an hermetically sealed envelope and an ionizable gaseous filling contained therewithin, it is deemed unnecessary to complicate the drawing by representing them therein.

Figure 2:
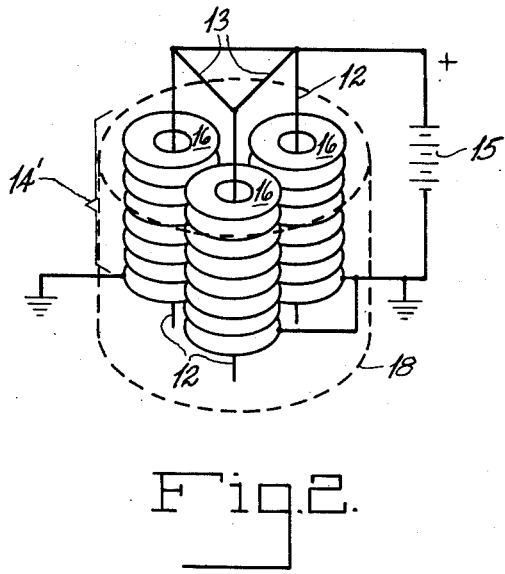
Fig. 2 represents another prior art multiple plate detector which is shown herein to assist the reader in understanding a limitation thereof.

Fig. 2 shows another prior art detector having certain disadvantages which have also already been explained above. This detector includes a plurality of independent cathode arrays 14' each comprising a number of disc-shaped elements 16 each of which has a circular perimeter and a centrally located aperture. The arrays are electrically multiplied together and are physically carried within an envelope represented by a dotted outline 18.

As has been explained the efficiency of this type of detector is affected by the fact that it is possible for interactions to take place within elements of the arrays 14' and for the charged-particle by-products of these interactions to escape entirely from the arrays into relatively field free areas surrounding them.

Figure 3:
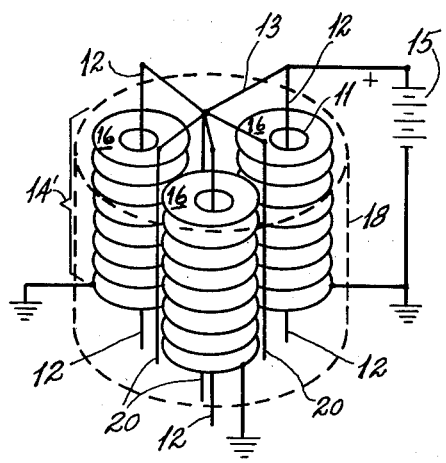
Fig. 3 represents a detector head of the same type as that shown in Fig. 2 but modified according to the present invention.

Fig. 3 shows an embodiment of the present invention which in most of its structural features may be identical to the detector head shown in Fig. 2. Therefore a number of its corresponding parts are similarly numbered. However the detector head of Fig. 3 comprises four auxiliary anodes 20 (one of which is omitted from the drawing to avoid confusion between closely spaced lines). In the operation of this detector head the fine wire anodes 12 and the auxiliary anodes are all multiplied together and connected to the positive pole of a source of a potential whose negative pole is connected to the multiplied cathode arrays (and elements). As a result a charged-particle collecting field is established between each of the auxiliary anodes and the exterior edges of adjacent cathode arrays, whereby these anodes will collect charged particles which have escaped from the arrays and might otherwise have found their way uselessly to the envelope walls or to elements of the cathode arrays or might have been absorbed in recombinations with positive ions.

Figure 4:
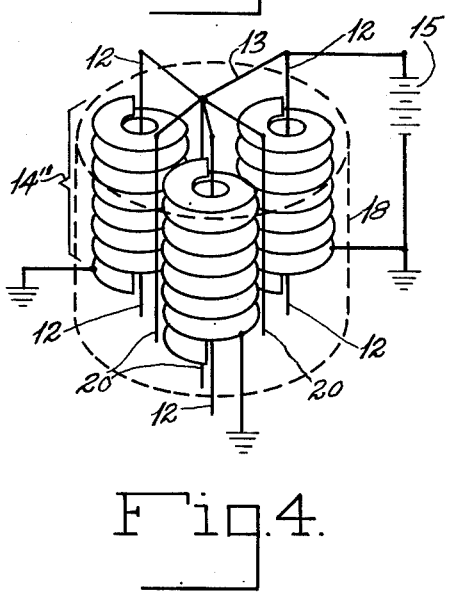
Fig. 4 is a modification of the embodiment of Fig. 3.

The detector head shown in Fig. 4 is a modification of that shown in Fig. 3 in that each of the three cathode arrays 14" which cooperate with the respective fine wire anodes 12 consists of a single flat band of metal formed into a helical shape rather than of a plurality of discs assembled in stacked array. This type of structure eliminates the need for certain support members, such as side rods, and therefore may afford the possibility of more economical construction. Furthermore when a number of helical cathode arrays of this kind are included in the same detector head, there is a reduced possibility, as compared to the embodiment of Fig. 3, that any particle which impinges on the detector moving along a straight line path of travel, will ever be able to pass exactly between a pair of adjacent cathode elements of one array and then, upon emerging from it, be able to do the same thing with respect to a second array.

Obviously many modifications and variations of the invention, as hereinbefore set forth may be made without departing from the spirit and scope thereof, and therefore only such limitations should be imposed as are indicated in the appended claims.

We claim:

1. A detector of penetrative radiation comprising a cathode array including a plurality of wafer-like elements stacked together with their surfaces in spaced-apart and co-extensive relationship, an anode within the array to receive therewithin charged particles escaping from a plurality of said elements and an auxiliary anode adjacent to the outside of said array for receiving particles escaping therefrom.

2. A detector of penetrative radiation comprising a plurality of cathode arrays each including a plurality of wafer-like elements stacked together with their surfaces in spaced-apart and co-extensive relationship, an anode within each array to receive charged particles escaping from a plurality of said elements therewithin and an auxiliary anode adjacent to the outside of a number of said arrays for receiving particles escaping from any thereof.

3. A detector of penetrative radiation comprising within a common gas-filled envelope: a plurality of cathode arrays each including a plurality of wafer-like elements stacked together with their surfaces in spaced-apart and co-extensive relationship, each of said elements having an aperture positioned therein so that the areas of its surfaces surrounding the aperture are symmetrical thereabout and so that in the array the apertures of all of the elements are in alignment; a fine wire anode extending centrally within the row of apertures; and an auxiliary anode adjacent to the outside of a number of said arrays for receiving particles escaping therefrom.

4. A detector as in claim 3 in which said auxiliary anode is a fine wire anode.

5. A detector as in claim 3 in which each of said elements is disc-shaped with a circular perimeter and with its said aperture concentric with said perimeter.

6. A detector of penetrative radiation comprising within a common gas-filled envelope a plurality of multiple-plate Geiger-Mueller detectors and at least one fine wire auxiliary electrode adjacent to the outside of at least one of the detectors.

7. A detector of penetrative radiation comprising a cathode array including a helix having windings which are relatively thin in the direction of the axis of the helix and wide in directions transverse thereto, such as a helix formed of a ribbon of metal disposed with one edge of the ribbon forming the outside of the helix and the other its inside, an anode extending centrally within the helix and an auxiliary anode adjacent to the outside of said array.

8. A detector of penetrative radiation comprising within a common gas-filled envelope a plurality of cathode arrays each including a helix having windings which are relatively thin in the direction of the axis of the helix and wide in directions transverse thereto, such as a helix formed of a ribbon of metal with one edge of the ribbon forming the outside of the helix and the other its inside, an anode extending centrally within the helix of each array and an auxiliary anode adjacent to the outside of a number of said arrays.

9. A detector of penetrative radiation comprising within an elongated common gas-filled envelope a plurality of multiple-plate Geiger-Mueller detectors disposed about the central longitudinal axis of the envelope and a fine wire auxiliary anode adjacent to the outside of said multiple-plate detectors near to said axis.

10. A detector as in claim 9 and further comprising an additional auxiliary anode extending longitudinally within the envelope in a region between and adjacent pair of the multiple-plate detectors and an interior surface of the envelope.

11. A detector of penetrative radiation comprising a gas-filled envelope containing a Geiger-Mueller cathode, a fine wire anode within said cathode and a fine wire anode outside of said cathode, the gaseous filling of the envelope extending between the cathode and both of said anodes.

References Cited in the file of this patent

UNITED STATES PATENTS

| Number | Name | Date |
| --- | --- | --- |
| 2,397,071 | Hare | Mar. 19, 1946 |
| 2,486,944 | Hare | Nov. 1, 1949 |
| 2,536,314 | Scherbatskoy | Jan. 2, 1951 |